United States Patent Office 3,202,659
Patented Aug. 24, 1965

3,202,659
2,5,8-TRIHYDRAZINO-TRI-s-TRIAZINE AND PROCESS THEREFOR
Charles D. Wright, North St. Paul, Minn., assignor to Minnesota Mining and Manufacturing Company, St. Paul, Minn., a corporation of Delaware
No Drawing. Filed Feb. 29, 1960, Ser. No. 11,922
2 Claims. (Cl. 260—249.6)

This invention relates to compounds containing the tri-s-triazine nucleus, and more particularly to 2,5,8-trihydrazino-tri-s-triazine.

The tri-s-triazine nucleus, also known as the cyameluric nucleus, and certain derivatives thereof such as the trihydroxy-, tri-cyanamido-, tri-chloro- and the like compounds have been prepared. These are generally considered to be compounds of very high stability owing to the large number of resonating forms which can exist. So far as I am aware, hydrazine derivatives of tri-s-triazine are heretofore unknown.

The object of this invention is to produce 2,5,8-trihydrazino-tri-s-triazine. Another object of the invention is to prepare a hydrazine-substituted cyameluric compound in sufficiently pure form that it may be stored without deterioration, and can be used for producing fluorinated oxidizing agents. Other objects of the invention will be apparent from the following disclosures.

2,5,8-trihydrazino-tri-s-triazine is a white, solid high-melting material which does not melt or decompose at temperatures up to 300° C., which is soluble in aqueous acids and insoluble in aqueous bases and which is substantially insoluble in the common inert solvents, such as benzene, alcohols, ethers, hydrocarbons and the like. The compound, which may also be named cyameluric hydrazide, can be represented by the formula:

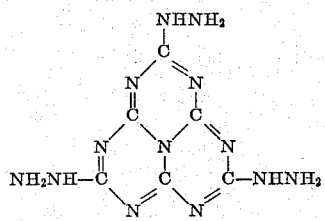

It is a useful intermediate for the preparation of fluorinated compounds which are oxidizing agents suitable for use as components of rocket propellants. The compound is also useful as a curing agent for epoxy resin prepolymers.

Broadly speaking, trihydrazino-tri-s-triazine can be prepared by the reaction of hydrazine hydrate with cyameluric derivatives, that is, compounds containing the cyameluric nucleus and having functional groups in the 2,5,8-positions which are replaceable by hydrazine hydrate. These are exemplified by melon, 2,5,8-trichloro-tri-s-triazine (cyameluric chloride), tri-s-triazine esters (e.g., methyl cyamelurate) or tri-cyanamido-tri-s-triazine (hydromelonic acid). These starting materials are known substances. The desired compound of the invention is prepared by heating the selected starting material with a stoichiometric excess of hydrazine or hydrazine hydrate, at temperatures ranging from about 100 to 250° C. The amount of hydrazine or the hydrate used in excess is not critical. Thus the process can be carried out by heating the starting materials with hydrazine or its hydrate at refluxing temperatures (118° C.) for several hours, e.g., about 24 hours. Preferably, the reaction is carried out in a sealed tube or autoclave and in the absence of air, at temperatures ranging from about 130° C. up to about 200° C. At higher temperatures, shorter reaction times are required. Solvents are not required, as both hydrazine and hydrazine hydrate are liquid and form a vehicle for the reaction.

The following specific examples will describe the preparation of the compound of the invention, and its properties, in somewhat more detail. In the description, all parts are by weight unless otherwise specified.

*Example 1*

2.5 parts of melon (from the pyrolytic decomposition of the thermal degradation products of "pseudo"-chlorthiocyanogen) and about 12.9 parts of hydrazine hydrate were placed in a strong glass ampoule. The ampoule was evacuated and then sealed. Thereafter, the mixture was heated for about 16 hours at about 145° C., with agitation. After cooling, the ampoule was opened, the reaction mixture was poured into a beaker and made acid to about pH 1 using 3 N aqueous hydrochloric acid. Most of the reaction mixture dissolved, forming a slightly yellow solution, while a small amount of unreacted starting material remained as a solid and was removed by filtration. The filtrate was then made basic using just sufficient dilute (about 5 percent) aqueous potassium hydroxide solution. A white precipitate of 2,5,8-trihydrazino-tri-s-triazine formed, and was recovered by filtration. The solid was again taken up in a sufficient amount of 10 percent aqueous hydrochloric acid to bring the solution to about pH 1 and reprecipitated by the addition of dilute potassium hydroxide solution. The precipitate was removed by filtration, washed with water and ethanol, and dried 16 hours at about 100° C. under 0.1 mm. of mercury pressure. About 0.9 parts of white, solid 2,5,8-trihydrazino-tri-s-triazine were recovered.

*Analysis.*—Calculated for $C_6N_{13}H_9$: C, 27.0; H, 3.4. Found: C, 27.4; H, 3.9.

The presence of hydrazine groups was confirmed by the presence of absorption bands corresponding to —NH groups in the infrared spectrogram of the compound.

The 2,5,8-trihydrazino-tri-s-triazine thus prepared was subjected to fluorination by passing fluorine gas through a suspension of 1 part of the substituted tri-s-triazine in 10 parts of perfluorooctane. A viscous yellow liquid was produced which contained a plurality of fluorine atoms. This material was a strong oxidizing agent which was shock sensitive. It is useful as a high-energy oxidizing component for a rocket propellant, in which it is combined with oxidizable fuels.

A mixture was prepared containing 1.4 parts of trihydrazino-tri-s-triazine, 5 parts of a liquid epoxy resin (diglycidyl ether of bis-phenol A, available commercially under the trade name "Epon 828"), and 0.1 part of finely divided silica (available commercially under the trade name "Cabasil"). The composition had excellent shelf life under ordinary temperature conditions and remained in the same uncured state as when first mixed. Upon heating to 200° C. for forty hours in a mold, the mixture cured to a strong, hard, tan-colored polymer which had very good thermal stability, and could be sawed, drilled or otherwise shaped. The polymer could be heated to temperatures upwards of 260° C. for many hours with relatively small weight loss.

*Example 2*

A mixture of 1 part of melon and 3 parts of substantially anhydrous hydrazine (commercially available hydrazine containing over 95 percent of the base) was sealed in a glass ampoule and heated for 16 hours at 130° C. The ampoule was then cooled in liquid nitrogen and opened. The semisolid reaction mixture was poured into a glass container and acidified with 6 N aqueuos hydrochloric acid to pH 1. The solution was then filtered and the filtrate was made basic by the addition of concentrated (30%) potassium hydroxide solution.

A white precipitate of 2,5,8-trihydrazino-tri-s-triazine formed and was recovered by filtration. The filter cake was washed thoroughly with water and 95 percent ethanol, and was dried at about 50° C. at a pressure of about 0.1 mm. The yield obtained was about 27 percent of theoretical, based on complete conversion of the melon to tri-s-triazine residues.

For purification, a portion of the product was dissolved in hydrochloric acid and reprecipitated as described in the preceding example. The product was a white solid material which appeared to be identical with that of Example 1.

*Analysis.*—Calculated for $C_6N_{13}H_9$: C, 27.4; H, 3.4; N, 69.2. Found: C, 27.2; H, 3.9; N. 67.7.

What is claimed is:
1. 2,5,8-trihydrazino-tri-s-triazine.
2. The process for the production of 2,5,8-trihydrazino-tri-s-triazine, which comprises heating together a stoichiometric excess of hydrazine and a compound containing the cyameluric nucleus at a temperature in the range of about 100 to 250° C. for a time sufficient to bring about significant production of 2,5,8-trihydrazino-tri-s-triazine.

References Cited by the Examiner

UNITED STATES PATENTS

| | | | |
|---|---|---|---|
| 2,211,707 | 8/40 | Zerweck et al. | 260—72 |
| 2,387,547 | 10/45 | Widmer et al. | 260—249.5 |

WALTER A. MODANCE, *Primary Examiner.*